United States Patent
Nashizawa

(10) Patent No.: US 9,635,331 B2
(45) Date of Patent: Apr. 25, 2017

(54) IMAGE PROCESSING APPARATUS THAT PERFORMS TONE CORRECTION AND EDGE ENHANCEMENT, CONTROL METHOD THEREFOR, AND STORAGE MEDIUM

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/689,506

(22) Filed: Apr. 17, 2015

(65) Prior Publication Data

US 2015/0312538 A1    Oct. 29, 2015

(30) Foreign Application Priority Data

Apr. 25, 2014    (JP) .................................. 2014-091350

(51) Int. Cl.
  *H04N 5/235*    (2006.01)
  *H04N 9/69*    (2006.01)
  *H04N 9/64*    (2006.01)
  *H04N 5/202*    (2006.01)
  *H04N 5/208*    (2006.01)

(52) U.S. Cl.
  CPC ............. *H04N 9/69* (2013.01); *H04N 5/202* (2013.01); *H04N 5/208* (2013.01); *H04N 9/646* (2013.01)

(58) Field of Classification Search
  None
  See application file for complete search history.

(56) References Cited

U.S. PATENT DOCUMENTS

| | | | |
|---|---|---|---|
| 7,843,493 B2 | 11/2010 | Katagiri et al. | |
| 8,228,397 B2 | 7/2012 | Katagiri et al. | |
| 8,982,242 B2 | 3/2015 | Toyoda et al. | |
| 9,357,131 B2 | 5/2016 | Toyoda et al. | |
| 2005/0275732 A1* | 12/2005 | Takeuchi ........... | H04N 1/00167 348/231.99 |

(Continued)

FOREIGN PATENT DOCUMENTS

| | | |
|---|---|---|
| CN | 102833471 A | 12/2012 |
| JP | 2007-228451 A | 9/2007 |

OTHER PUBLICATIONS

Nov. 2, 2016 Chinese Office Action corresponding to Chinese Patent Application No. 201510205462.1.

*Primary Examiner* — Stephen Coleman
(74) *Attorney, Agent, or Firm* — Fitzpatrick, Cella, Harper & Scinto

(57) ABSTRACT

An image processing apparatus which enables natural edge enchantment suited to a frequency band of a subject even when performing local contrast correction in combination with edge enhancement. A local contrast correction unit multiplies a signal of a target pixel in image data by a gain based on values obtained by reflecting signals of pixels around the target pixels. For signals of the target pixel output from the local contrast correction unit, a gamma conversion unit performs gamma conversion based on the signal of the target pixel. An edge signal is extracted from the image data and multiplied by a gain based on a signal output from the local contrast correction unit. The edge signal is added to a signal output from the gamma conversion unit.

10 Claims, 12 Drawing Sheets

(56) References Cited

U.S. PATENT DOCUMENTS

2012/0105627 A1* 5/2012 Nakata ................... H04N 1/407
  348/135
2012/0320236 A1* 12/2012 Toyoda ................ H04N 5/2625
  348/231.99

* cited by examiner

IMAGE PROCESSING APPARATUS THAT PERFORMS TONE CORRECTION AND EDGE ENHANCEMENT, CONTROL METHOD THEREFOR, AND STORAGE MEDIUM

BACKGROUND OF THE INVENTION

Field of the Invention

The present invention relates to an image processing technique for image pickup apparatuses such as digital cameras and video cameras, cellular phones, personal computers (such as laptop, desktop, and tablet computers), and game machines, and in particular to an image processing apparatus using combined techniques of tone correction and edge enhancement, a control method therefor, and a storage medium.

Description of the Related Art

Some image processing techniques correct a dark part of blocked-up shadows and a bright part of blown-out highlights in an image to favorable brightness by performing tone correction through gamma conversion or histogram equalization using a tone curve. Depending on scenes, however, using one tone conversion table for one screen will present a problem of tone in a halftone area being sacrificed by producing tone of a dark part and a bright part.

Accordingly, the Retinex model is drawing attention. The Retinex model focuses on the property of human vision that is insensitive to a low-frequency component such as illumination light shed on an overall scene but is sensitive to a high-frequency component such as a contrast between an area being watched and an area surrounding it. Examples of methods for tone correction complying with this model include local contrast correction.

In local contrast correction, tone correction is performed on only a low-frequency component, and this enables natural correction of overall tone while maintaining a local contrast which is a high-frequency component. However, according to this Retinex model, since a high-frequency component is individually handled, and this changes reproduction of an edge, the amount of edge enhancement may not be appropriate when local contrast correction is performed in combination with conventional sharpness processing.

Accordingly, there has been proposed a technique which calculates a sharpness parameter (amount of correction) according to area size when locally processing each of a plurality of areas in a divided image (Japanese Laid-Open Patent Publication (Kokai) No. 2007-228451).

In Japanese Laid-Open Patent Publication (Kokai) No. 2007-228451, a filter size of an illumination component extraction filter is taken as an example of area size. When the filter size is large, edge enhancement is performed with bold sharpness, and when the filter size is small, edge enhancement is performed with relatively fine sharpness.

According to this method, edge enhancement suited to a thickness of an extracted reflectance component is enabled by controlling the amount of sharpness according to a filter size for an illumination component, but edge enhancement is not always suited to a frequency band of a subject because no consideration is given to an actual input image.

SUMMARY OF THE INVENTION

The present invention provides an image processing apparatus and a control method therefor which enable natural edge enchantment suited to a frequency band of a subject even when performing local contrast correction in combination with an edge enhancement process, as well as a storage medium.

Accordingly, the present invention provides an image processing apparatus comprising a first correction unit configured to multiply signal of a target pixel in image data by a gain based on values obtained by reflecting signals of pixels around the target pixel, a gamma conversion unit configured to, for a signal of the target pixel output from the first correction unit, carry out gamma conversion based on the signal of the target pixels, an edge extraction unit configured to extract an edge signal from the image data, a second correction unit configured to multiply the edge signal corresponding to the target pixel by a gain based on a signal output from the first correction unit, and an adding unit configured to add the edge signal output from the second correction unit to a signal output from the gamma conversion unit.

According to the present invention, in an edge signal generation system for luminance adjustment, a signal which has been subjected to a local contrast correction process is used as a luminance signal for reference to a luminance-by-luminance gain table, and a signal which has not been subjected to the local contrast correction process is used as a luminance signal for edge extraction. This enables natural edge enchantment suited to a frequency band of a subject.

Further features of the present invention will become apparent from the following description of exemplary embodiments (with reference to the attached drawings).

DESCRIPTION OF THE EMBODIMENTS

Figure 1:
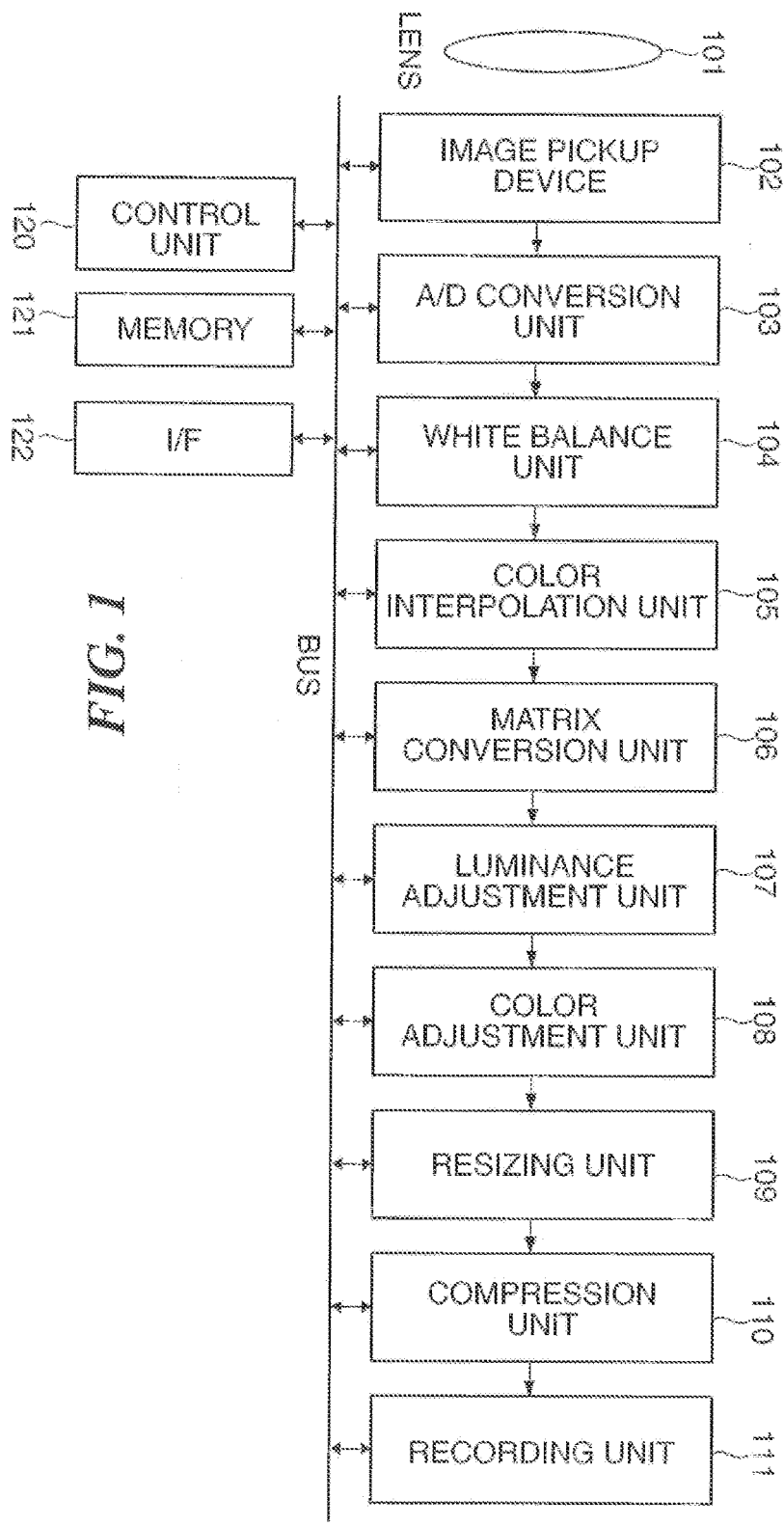
FIG. 1 is a block diagram schematically showing a digital camera which is a first embodiment of an image processing apparatus according to the present invention.

FIG. 1 is a block diagram schematically showing a digital camera which is a first embodiment of an image processing apparatus according to the present invention.

Referring to FIG. 1, an image pickup device 102 performs photoelectric conversion of a subject image formed through an imaging optical system (lens) 101. It is assumed that the image pickup device 102 is, for example, a single plate color image pickup device having a typical primary color filter. The primary color filter has three types of color filters with ranges of transparent dominant wavelengths near 650 nm, 550 nm, and 450 nm, respectively, and shoots color planes corresponding to R (red), G (green), and B (blue) bands, respectively. In the single plate color image pickup device 102, these three types of color filters are spatially arrayed on a pixel-by-pixel basis, and in each pixel, only a strength of a single color plane is obtained. For this reason, a color mosaic image is output from the image pickup device 102.

An A/D conversion unit 103 converts a color mosaic image, which is output as an analog voltage from the image pickup device 102, into digital data suitable for subsequent image processing. A white balance unit 104 specifically multiplies each of R, G, and B by gains which make R, G, and B isochromatic in an area supposed to be white.

A color interpolation unit 106 interpolates a color mosaic image to generate a color image with all pixels having all of R, G, and B color information. The color image generated by the color interpolation unit 105 is generated into a basic color image by way of a matrix conversion unit 106 and a luminance adjustment unit 107. After that, a color adjustment unit 108 performs image correction such as noise reduction, chroma enhancement, hue correction, or edge enhancement. A resizing unit 109 resizes an image which has been subjected to a desired color adjustment by the color adjustment unit 108 into a desired recording size, and the image with high resolution is compressed using a compression method such as JPEG by a compression unit 110 and recorded in a recording medium such as a memory card by a recording unit 111.

A control unit 120 is comprised of, for example, a CPU and controls the overall operation of the camera. A memory 121 is a storage device for temporarily storing image data read out from the recording unit 111 and has a storage capacity enough to store image data for a predetermined time period. The memory 121 is also usable as a work area for the control unit 120 or the like. An I/F 122 establishes connection with and carries out communications with external devices under the control of the control unit 120.

Figure 2:
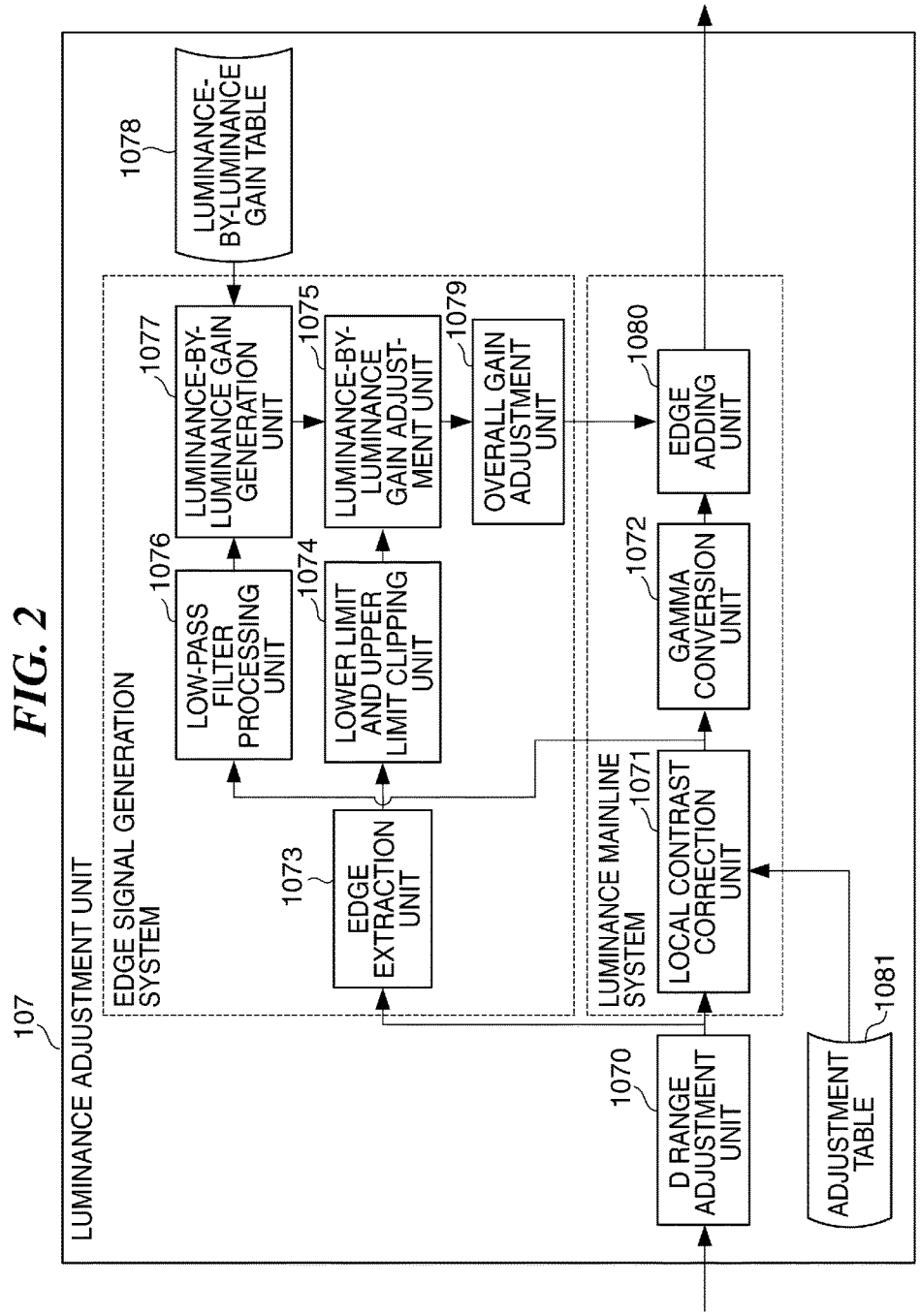
FIG. 2 is a control block diagram of a luminance adjustment unit.
Figure 3:
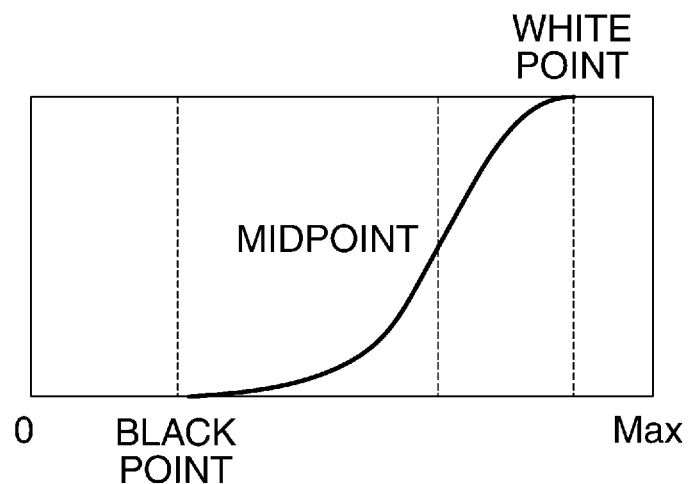
FIG. 3 is a graph showing a gamma curve determined by a black point and a white point.
Figure 4:
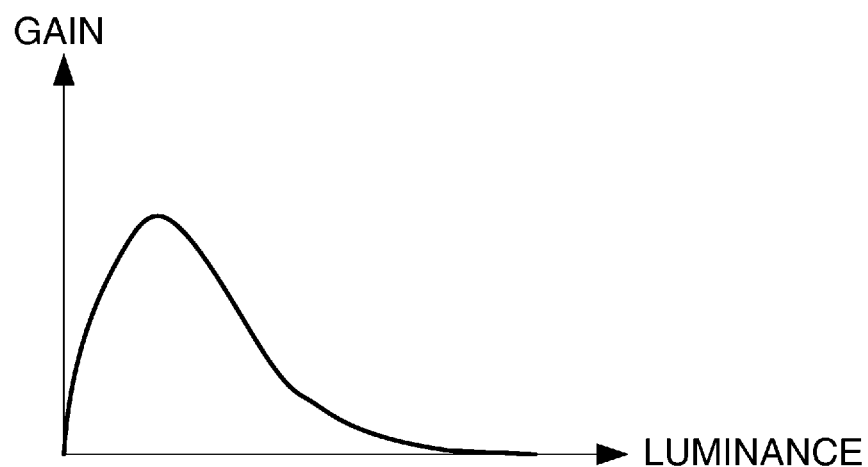
FIG. 4 is a view showing an exemplary luminance-by-luminance gain table.

Referring next to FIGS. 2 to 6C, a concrete description will be given of the luminance adjustment unit 107. FIG. 2 is a control block diagram of the luminance adjustment unit 107. FIG. 3 is a graph showing a gamma curve determined by a black point Bk and a white point Wt. FIG. 4 is a view showing an exemplary luminance-by-luminance gain table 1078.

Referring to FIG. 2, in the luminance adjustment unit 107, processes such as overall dynamic range adjustment (D range adjustment), local contrast correction, gamma conversion, and edge enhancement associated with them are carried out. A D range adjustment unit 1070 converts a dynamic range of an input signal into a signal range determined by the black point Bk and the white point Wt as shown in FIG. 3. The black point Bk is a point at which output after gamma conversion using the curve shown in FIG. 3 becomes zero, and the white point Wt is a point at which output becomes a maximum value of an output D range. This dynamic range conversion adjusts an input signal Y to an output signal Ys using an equation (1) below.

$$Ys=(Y-Bk)*\text{Max}/(Wt-Bk) \tag{1}$$

Here, Max is set to a maximum value for bits to be processed, for example, 4095 for 12 bits.

Then, in the luminance adjustment unit 107, two processes, i.e. a process in a luminance mainline system and a process in an edge signal generation system for generation of an edge signal to be added for edge enhancement are carried out. First, an output signal from the D range adjustment unit 1070 is subjected as a signal for the luminance mainline system to a local contrast correction process by a local contrast correction unit 1071. Detailed description of the local contrast correction process will be given later. The signal subjected to the local contrast correction process is subjected to gamma conversion on a pixel-by-pixel basis based on values of signals thereof by a gamma conversion unit 1072, and an edge signal generated by the process in the edge signal generation system is added to the signal by an edge adding unit 1080.

Also, the output signal from the D range adjustment unit 1070 is additionally subjected to processing for edge component extraction by an edge extraction unit 1073. A method for edge component extraction is not particularly limited, but for example, a method using an edge extraction filter such as a high-pass filter and a method using a difference between a signal obtained by blurring an input signal and the input signal. An extracted edge signal is subjected to fine adjustment by a lower limit/upper limit clipping unit 1074.

A lower limit clipping unit determines and clips a noise signal included in the edge signal using a lower limit threshold value, and an upper limit clipping unit determines and clips a noise signal included in the edge signal using an upper limit threshold value so as to prevent excessive edge enhancement. The upper limit and lower limit threshold values should be set based on the noise level of the input signal, the allowable amount of overshooting, or the like. The edge signal subjected to fine adjustment by the lower limit/upper limit clipping unit 1074 is further controlled by a luminance-by-luminance gain adjustment unit 1075 so that the amount of gain can be appropriate on a luminance-by-luminance basis.

A description will now be given of how luminance-by-luminance gains for making luminance-by-luminance gain adjustments are generated. An output signal from the local contrast correction unit 1071 is additionally subjected to a process in which it is blurred by a low-pass filter processing unit 1076. Then, the signal with a lowered frequency band is assumed as a luminance signal for reference to a luminance-by-luminance gain table 1078 in FIG. 4 to generate luminance-by-luminance gains for respective pixels using a luminance-by-luminance gain generation unit 1077.

Here, the luminance-by-luminance gain table 1078 needs to be associated with gamma characteristics used by the gamma conversion unit 1072. This is because an edge is actually added to a nonlinear signal after gamma conversion although edge extraction is performed on a linear signal before gamma conversion. This luminance-by-luminance gain adjustment enables the amount of edge to be appropriate in any luminance range.

The edge signal output from the lower limit/upper limit clipping unit 1074 is multiplied by a plane based on gains determined for respective pixels obtained as a result of the process described above, that is, a luminance-by-luminance gain plane by the luminance-by-luminance gain adjustment unit 1075. After that, an overall gain adjustment unit 1079 finally adjusts the total gain and determines an edge signal which is to be added to the luminance signal in the mainline system.

Figure 5:
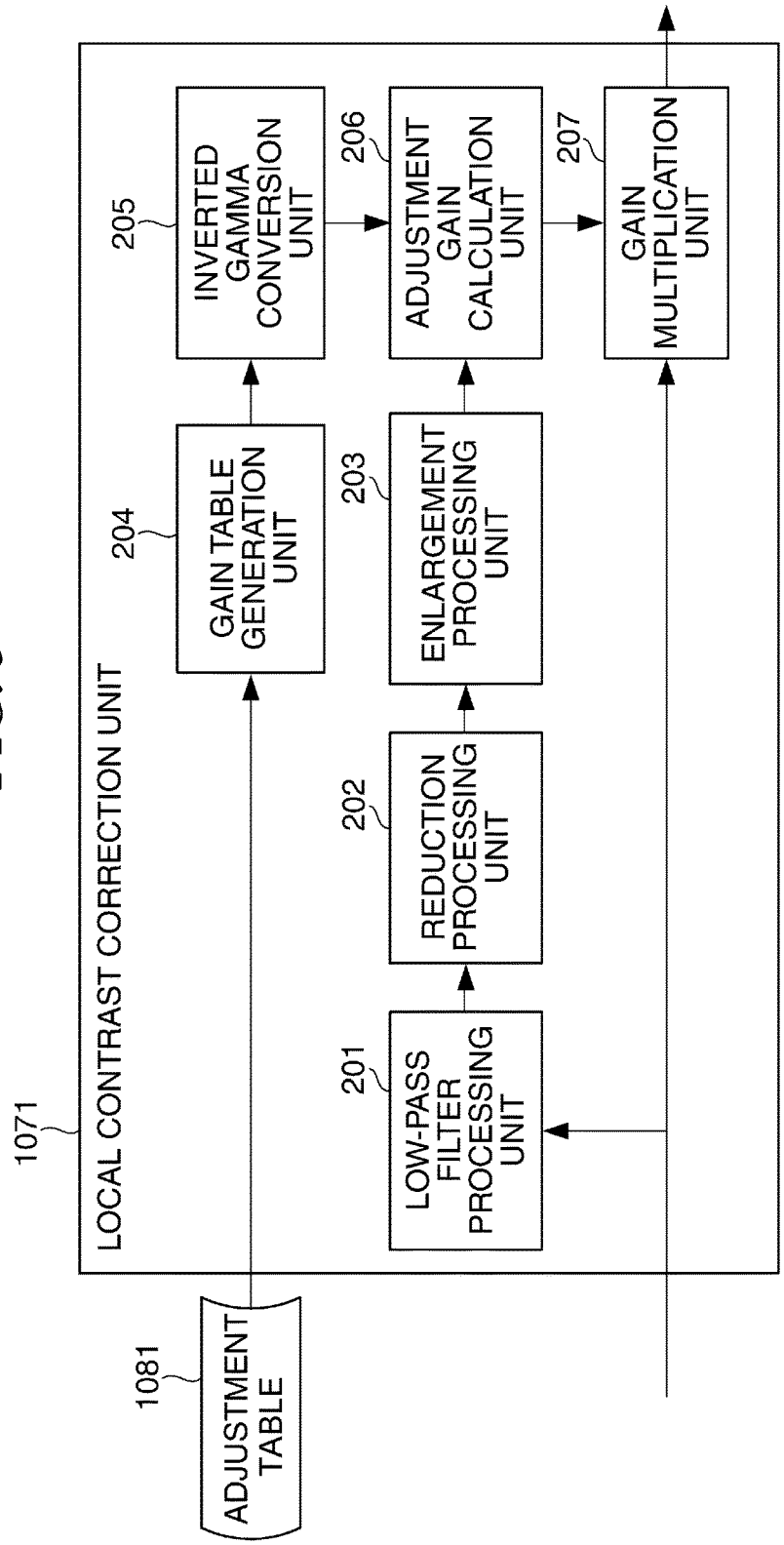
FIG. 5 is a control block diagram of a local contrast correction unit.

Referring next to FIGS. 5 and 6A to 6C, a concrete description will be given of the local contrast correction unit 1071. FIG. 5 is a control block diagram of the local contrast correction unit 1071.

Referring to FIG. 5, the low-pass filter processing unit 201 carries out a process in which it cuts a high frequency component for an output signal from the D range adjustment unit 1070 in FIG. 2. This is intended to reduce a frequency range in advance so as to prevent aliasing from occurring in a subsequent process by a reduction processing unit 202. The signal subjected to the low-pass filtering process is passed through the reduction processing unit 202 and an enlargement processing unit 203 to become a blurred luminance signal. As a result of this process, luminance signals corresponding to respective pixels input to the low-pass filter processing unit 201 are mixed with luminance signals corresponding to pixels around the respective pixels, and resultant signals are output from the enlargement processing unit 203. Namely, a luminance signal corresponding to each pixel output from the enlargement processing unit 203 represents a typical luminance signal in an area centered on the pixel.

Figure 6A:
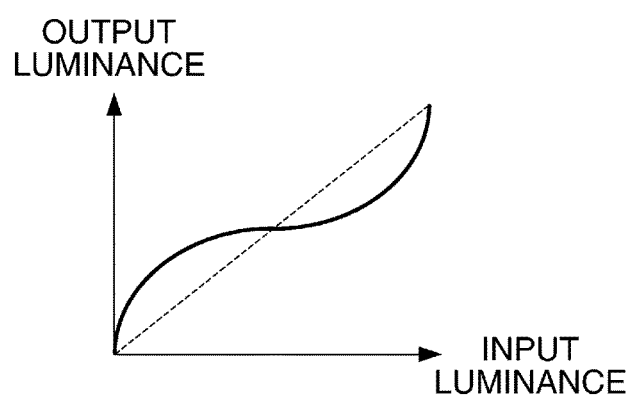
FIGS. 6A to 6C are graphs showing exemplary adjustment tables for local contrast correction.
Figure 6B:
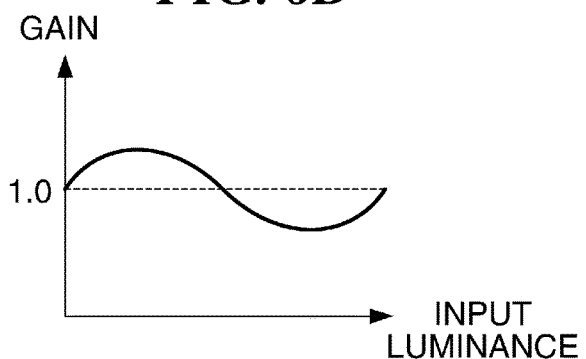
Figure 6C:
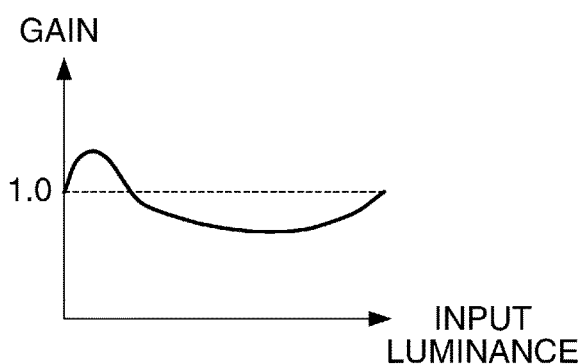

On the other hand, a gain table generation unit 204 generates a local contrast correction gain table in FIG. 6B using an adjustment table 1081 in FIG. 6A as an input. Specifically, a correction gain table is obtained by dividing an output of the adjustment table 1081 by an input. It is assumed here that the adjustment table 1081 is designed in a nonlinear space after gamma conversion, and hence an inverted gamma conversion unit 205 converts the adjustment table 1081 into a correction gain table in a linear space as shown in FIG. 6C.

An adjustment gain calculation unit 206 calculates gains for respective pixels using an output signal from the enlargement processing unit 203 as a reference luminance using the correction gain table obtained as a result of the process described above. The local contrast correction process is carried out by the gain multiplying unit 207 multiplying an output signal from the D range adjustment unit 1070 in FIG. 2 by the gains calculated by the adjustment gain calculation unit 206. In this way, local contrast correction is performed which, for each pixel, reflects not only a luminance signal of this pixel but also values of luminance signals of peripheral pixels around the pixel. It should be noted that although in the present embodiment, the adjustment table 1081 is set in a nonlinear space so as to be easily designed through intuition, the adjustment table 1081 may be set in a linear space in advance. In this case, processing by the inverse gamma conversion unit 205 in FIG. 5 is dispensed with.

In correction of an illumination component based on the Retinex model, only a low-frequency component is subjected to tone correction, but in local contrast correction in the present embodiment which corresponds to correction of an illumination component, an original signal including a high-frequency component as well is corrected with the amounts of correction for a low-frequency component and a high-frequency component being different. This is because an edge enhancement process is not incorporated in the local contrast correction process, but the local contrast correction process and a conventional edge enhancement process are performed in combination. As a result, the same arrangement is allowed to be adopted irrespective of whether or not local contrast correction is performed, and this makes system control easier.

As described above, the luminance adjustment unit 107 uses, in the edge signal generation system, a signal which has been subjected to the local contrast correction process as a luminance signal for reference to the luminance-by-luminance gain table and uses a signal which has not been subjected to the local contrast correction process as a luminance signal for edge extraction. The reason why a signal which has been subjected to the local contrast correction process is used as a luminance signal for reference to the luminance-by-luminance gain table is to match the signal level of the edge signal generation system to that of a luminance signal in the luminance main line system. This is because the luminance-by-luminance gain adjustment is based on the assumption that the signal level of a luminance signal in the luminance main line system is consistent with the signal level of a luminance signal in the edge signal generation system from the viewpoint of adding an appropriate amount of edge according to luminance.

On the other hand, the reason why a luminance signal for edge extraction is not subjected to the local contrast correction process is that if edge extraction is performed on a luminance signal which has been subjected to the local contrast correction process, an edge is detected to an excessive degree as compared with a case where the luminance signal is not subjected to the local contrast correction process. This is because the local contrast correction process will relatively intensify a high-frequency component because only a low-frequency component is subjected to D range compression, that is, the local contrast process itself has such an effect as unsharp masking.

As described above, according to the present embodiment, in the edge signal generation system for luminance adjustment, a signal which has been subjected to the local contrast correction process is used as a luminance signal for reference to the luminance-by-luminance gain table, and a signal which has not been subjected to the local contrast correction process is used as a luminance signal for edge extraction. As a result, appropriate edge enhancement which is unexcessive is enabled during local contrast correction as well, and hence natural edge enhancement suited to a frequency band of a subject even when local contrast correction is performed in combination with an edge enhancement process.

Referring next to FIGS. 7 to 11, a description will be given of a digital camera which is a second embodiment of the image processing apparatus according to the present invention. It should be noted that portions overlapping or equivalent to those in the first embodiment described above will be described using the same reference numerals in the figures, and description thereof will be simplified or omitted.

In the first embodiment described above, D range adjustment and local contrast correction are performed based on parameters (amounts of correction) and adjustment tables for D range adjustment set in advance. On the other hand, in the present embodiment, a suitable amount of sharpness is adjusted based on parameters for D range adjustment and local contrast corrections specified by user operation on a GUI.

Figure 7:
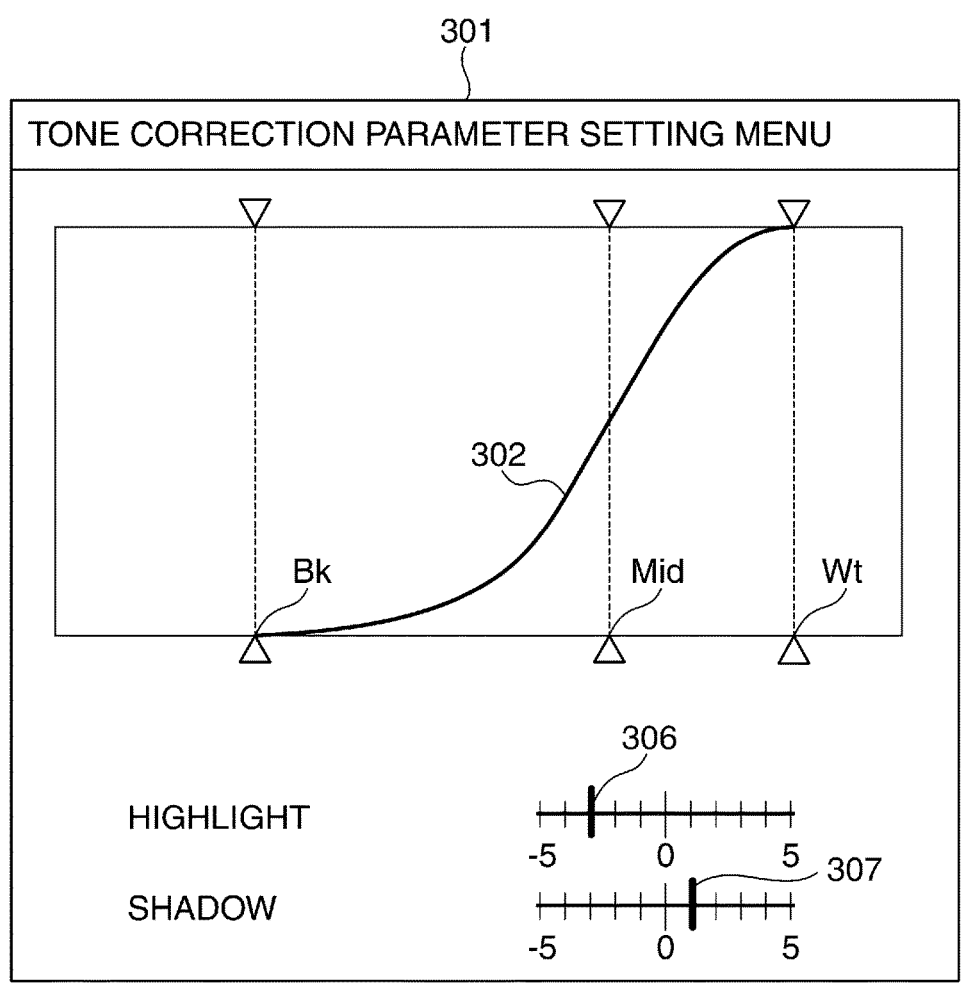
FIG. 7 is a view showing a tone correction parameter setting menu which is an exemplary GUI in a digital camera which is a second embodiment of the image processing apparatus according to the present invention.

FIG. 7 is a view showing a tone correction parameter setting menu 301 which is an exemplary GUI. A black point bk, a midpoint Mid, and a white point Wt which are allowed to be adjusted through user operation are placed on the tone correction parameter setting menu 301 in FIG. 7. By adjusting these points, the user is allowed to change characteristics of a gamma 302.

Also, a highlight slider 306 and a shadow slider 307 are placed on the tone correction parameter setting menu 301. A highlight function is to adjust only a high-luminance side in luminance tone. When the highlight slider 306 is slid leftward as viewed in the figure, luminance on a high-luminance side in an image decreases, and when the highlight slider 306 is slid rightward as viewed in the figure, luminance on a high-luminance side in an image increases. A shadow function is to adjust only a low-luminance side in luminance tone. When the shadow slider 307 is slid leftward as viewed in the figure, luminance on a low-luminance side in an image decreases, and when the shadow slider 307 is slid rightward as viewed in the figure, luminance on a low-luminance side in an image increases.

Figure 8:
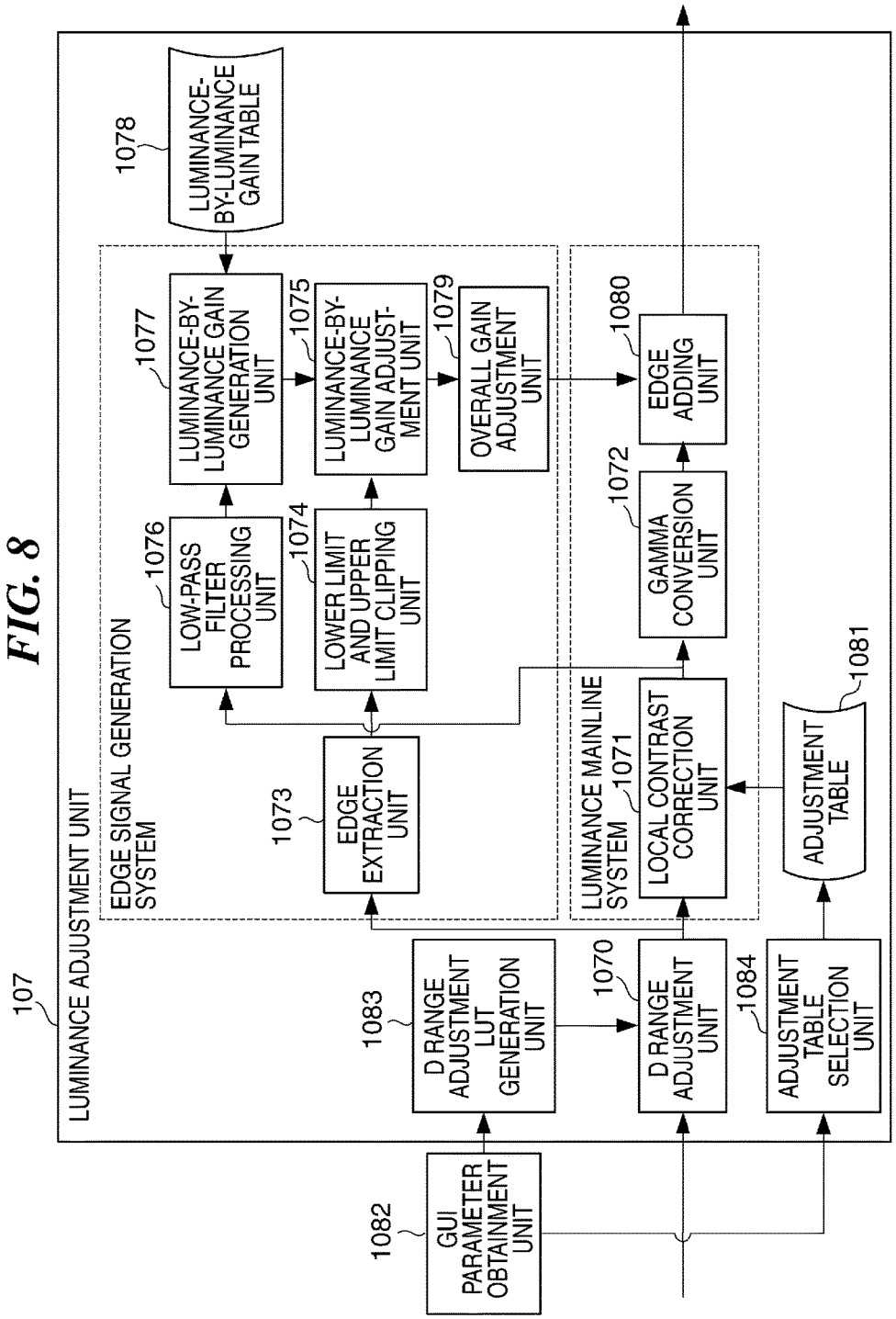
FIG. 8 is a control block diagram of a luminance adjustment unit.

FIG. 8 is a block diagram of the luminance adjustment unit 107. As shown in FIG. 8, the luminance adjustment unit 107 according to the present embodiment is constructed by adding a GUI parameter obtainment unit 1082, a D range adjustment LUT generation unit 1083, and an adjustment table selection unit 1084 to the first embodiment (FIG. 2) described above.

Figure 9:
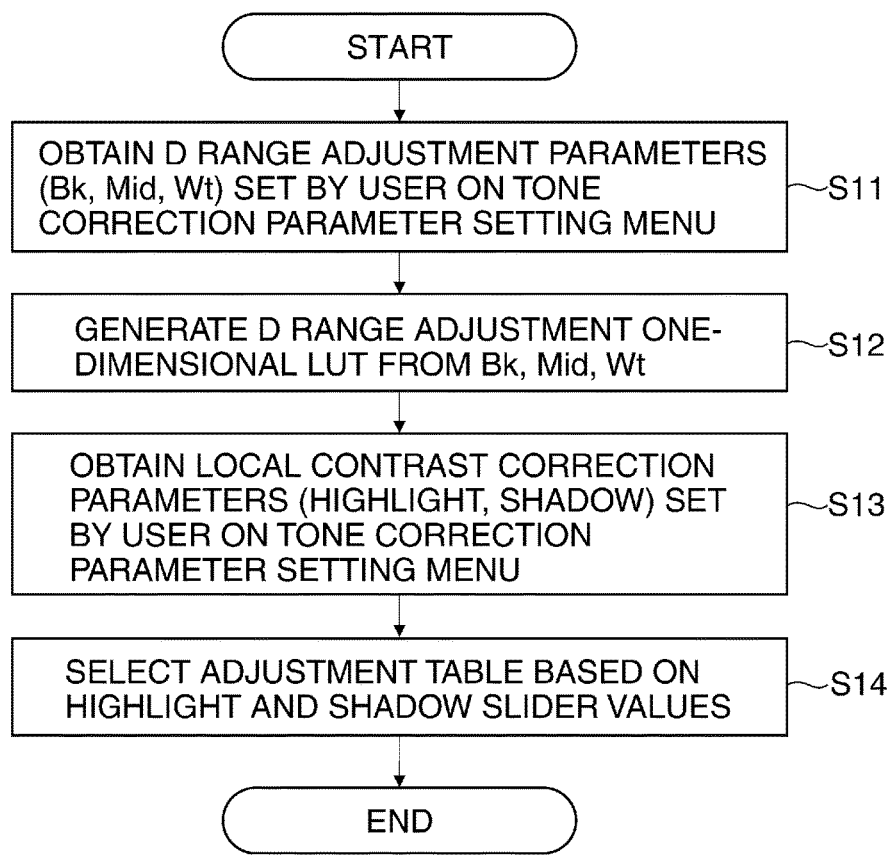
FIG. 9 is a flowchart showing an exemplary process in which user settings on the tone correction parameter setting menu are reflected on parameters for use in D range adjustment and local contrast correction.

FIG. 9 is a flowchart showing an exemplary process in which user settings on the tone correction parameter setting menu 301 are reflected on parameters for D range adjustment and local contrast correction. Each process in FIG. 9 is carried out by a CPU or the like of the control unit 120 expanding a control program stored in a ROM, not shown, into the memory 121.

Referring to FIG. 9, in step S11, the control unit 120 obtains the black point Bk, the midpoint Mid, and the white point Wt which are parameters for D range adjustment set by the user on the tone correction parameter setting menu 301, and the process proceeds to step S12. Specifically, the control unit 120 causes the GUI parameter obtainment unit 1082 to obtain information on each point via the I/F 122 in FIG. 1.

In the step S12, based on the parameters for D range adjustment obtained in the step S11, the control unit 120 causes the D range adjustment LUT generation unit 1083 to generate a D range adjustment LUT (look-up table), and the process proceeds to step S13.

Figure 10:
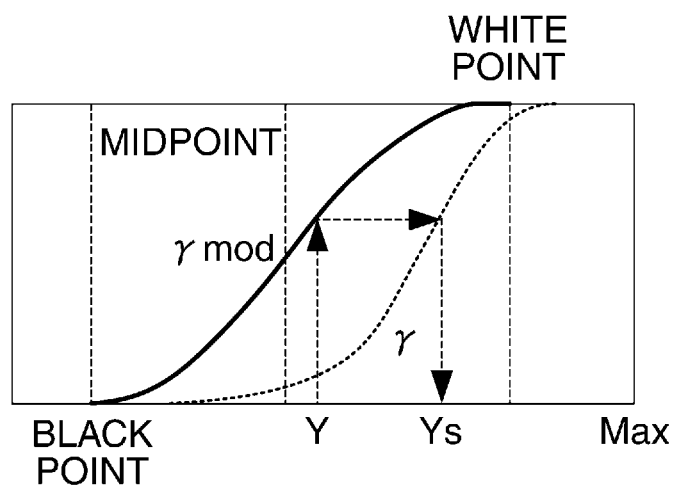
FIG. 10 is a graph showing a γ curve before and after D range adjustment.

Referring now to FIG. 10, a concrete description will be given of how the D range adjustment LUT is generated. A broken line $\gamma$ in FIG. 10 is a $\gamma$ curve before adjustment. On the other hand, a solid line $\gamma$ mod is a $\gamma$ curve after adjustment which is determined by adjusting the black point Bk, the midpoint Mid, and the white point Wt. When each of these two $\gamma$ curves is expressed by a one-dimensional LUT having a finite number of elements, equations (2) and (3) below hold.

$$Y'=\gamma[Y] \quad (2)$$

$$Y'=\gamma \bmod [Y] \quad (3)$$

The number of elements is, for example, 1024 for a 10-bit accuracy. To generate 1024 elements from the three points consisting of the black point Bk, the midpoint Mid, and the white point Wt, well-known cubic spline interpolation or the like should be used.

The luminance-by-luminance gain table 1078 is designed with consideration given to $\gamma$ characteristics as described above. Thus, only a difference between $\gamma$ and $\gamma$ mod, not $\gamma$ mod, should be considered in D range adjustment. Specifically, referring to FIG. 10, an output value of $\gamma$ mod for an input signal Y is obtained, and an input signal Ys for $\gamma$ having this output value should be reversely searched for. The input signal Ys after D range adjustment for the input signal Y is obtained using an equation (4) below.

$$Ys=\gamma-1[\gamma \bmod [Y]] \quad (4)$$

In the step S13, the control unit 120 obtains slider values of the respective highlight and shadow sliders set by user operation on the tone correction parameter setting menu 301, and the process proceeds to step S14. Specifically, the control unit 120 causes the GUI parameter obtainment unit 1082 to obtain slider values of the respective highlight and shadow sliders via the I/F 122 in FIG. 1.

Figure 11:
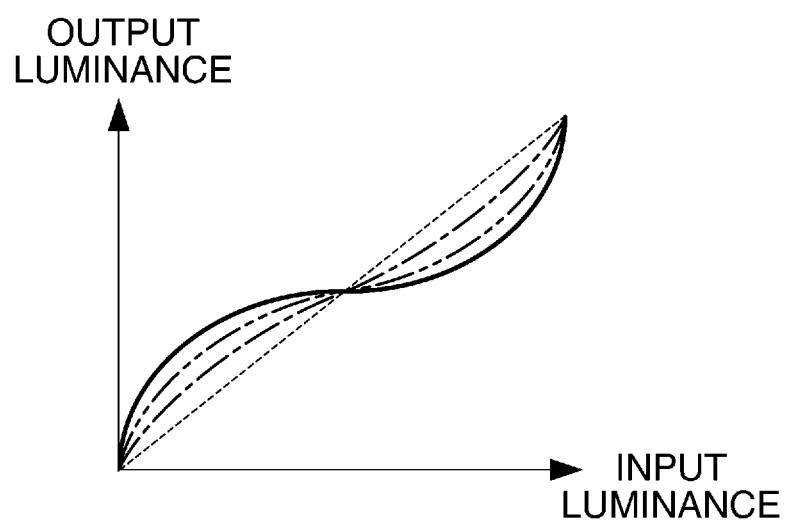
FIG. 11 is a graph showing types of adjustment tables for local contrast correction.

In the step S14, based on the obtained GUI parameters, the control unit 120 causes the adjustment table selection unit 1084 to select a corresponding adjustment table from among multiple types of adjustment tables prepared in advance as shown in FIG. 11. For example, when the slider values of the highlight and shadow sliders are set at ±1, an adjustment table represented by a dashed-dotted line in FIG. 11 is selected. Likewise, when the slider values of the highlight and shadow sliders are set at ±2, an adjustment table represented by a chain double-dashed line is selected, and when the slider values of the highlight and shadow sliders are set at ±3, an adjustment table represented by a solid line is selected.

After the parameters for D range adjustment and the adjustment table for local contrast correction are selected, the same process as in the first embodiment described above, that is, D range adjustment, local contrast correction, gamma conversion, and addition of a generated edge signal are performed in this order.

As described above, according to the present embodiment, parameters for D range adjustment and an adjustment table for local contrast correction are determined based on setting values set on the GUI by the user, and this enables more accurate edge enhancement. The other constitution and operational advantages are the same as those of the first embodiment described above.

Figure 12:
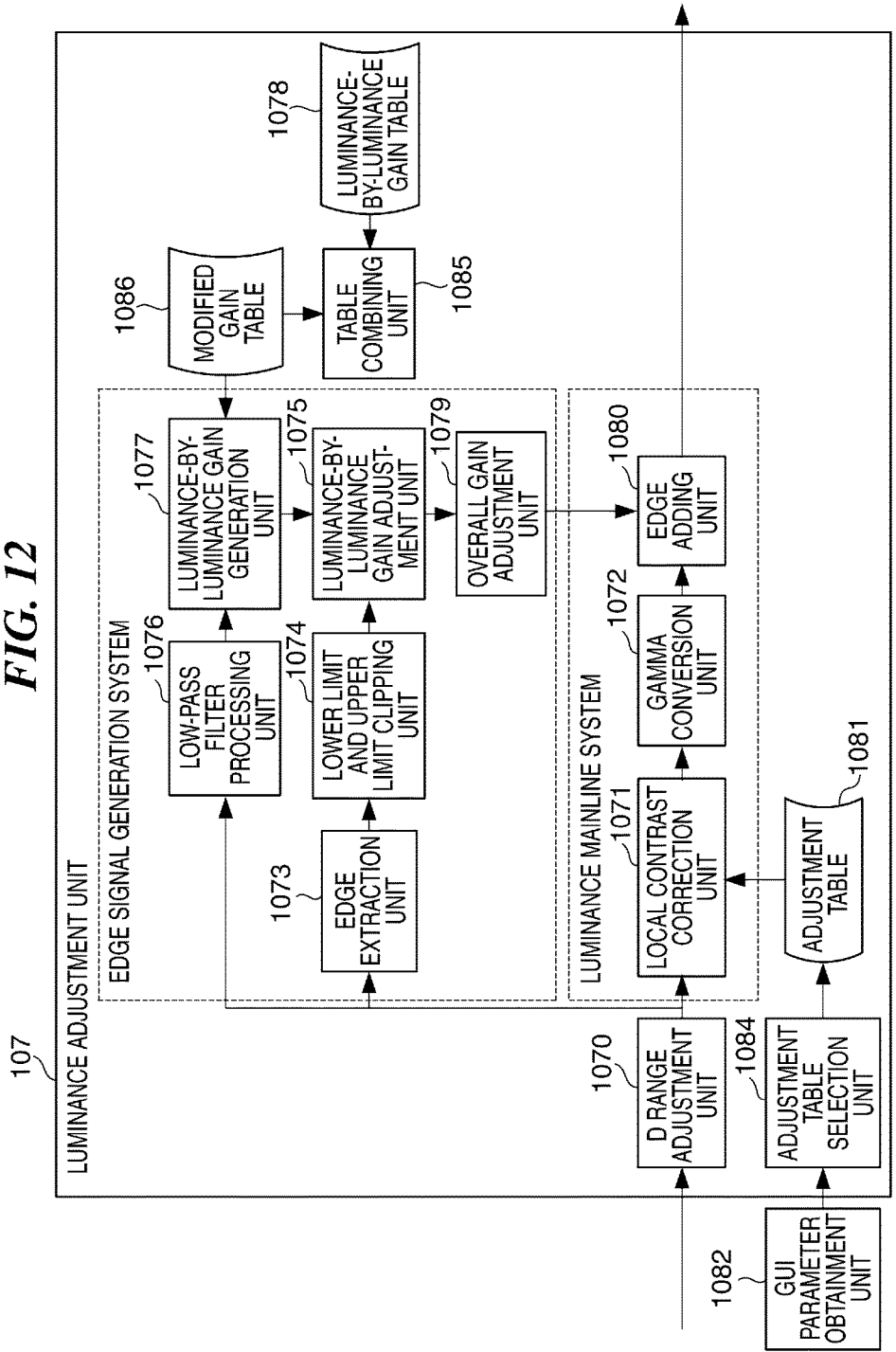
FIG. 12 is a control block diagram of a luminance adjustment unit in a digital camera which is a third embodiment of the image processing apparatus according to the present invention.
Figure 13:
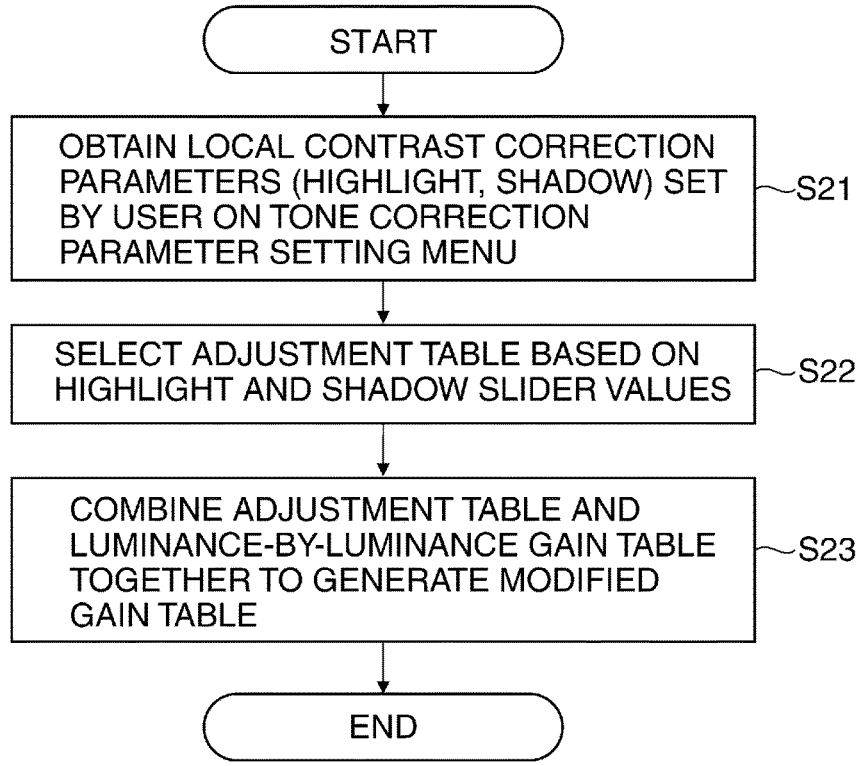
FIG. 13 is a flowchart showing a concrete process in which a luminance-by-luminance gain table is modified by the luminance adjustment unit.
Figure 14:
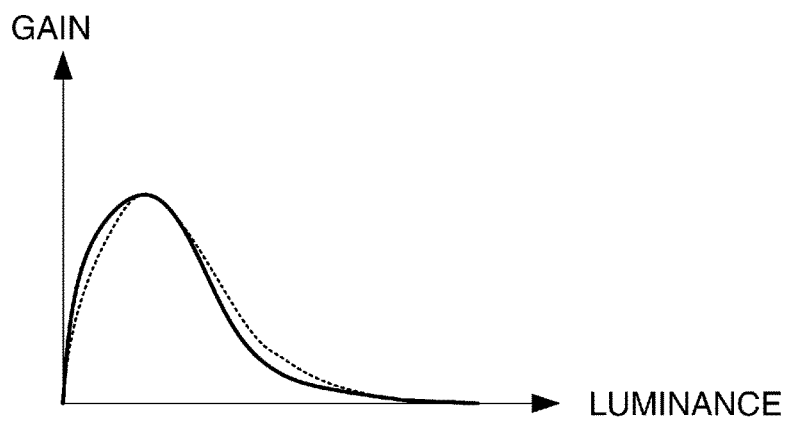
FIG. 14 is a graph showing an exemplary luminance-by-luminance gain table before and after modification.

Referring next to FIGS. 12 to 14, a description will be given of a digital camera which is a third embodiment of the image processing apparatus according to the present invention. It should be noted that portions overlapping or equivalent to those in the first embodiment described above will be described using the same reference numerals in the figures, and description thereof will be simplified or omitted.

FIG. 12 is a control block diagram of the luminance adjustment unit 107. As shown in FIG. 12, the luminance adjustment unit 107 according to the present embodiment is constructed by adding the GUI parameter obtainment unit 1082, the adjustment table selection unit 1084, a table combining unit 1085, and a modified gain table 1086 to the first embodiment (FIG. 2) described above.

In the first embodiment described above, the luminance-by-luminance gain generation unit 1077 generates luminance-by-luminance gains from a blurred signal obtained by causing the low-pass filtering processing unit 1076 to perform low-pass filtering on a signal which has been subjected to the local contrast correction process by the local contrast correction unit 1071. On the other hand, in the present embodiment, a luminance-by-luminance gain table is modified by combining the luminance-by-luminance gain table and an adjustment table together in luminance adjustment, and luminance-by-luminance gains are generated based on the modified luminance-by-luminance gain table. Thus, in the present embodiment, a signal input to the low-pass filtering processing unit 1076 is not an output signal from the local contrast correction signal 1071 but an output signal from the D range adjustment unit 1070.

Referring next to FIG. 13, a concrete description will be given of how the luminance adjustment unit 107 modifies a luminance-by-luminance gain table. Each process in FIG. 13 is carried out by a CPU or the like of the control unit 120 expanding a control program stored in a ROM, not shown, into the memory 121.

Referring to FIG. 13, in step S21, the control unit 120 obtains slider values of the respective highlight and shadow sliders set by user operation on the tone correction parameter setting menu 301, and the process proceeds to step S22. Specifically, the control unit 120 causes the GUI parameter obtainment unit 1082 to obtain slider values of the respective highlight and shadow sliders via the I/F 122 in FIG. 1.

In the step S22, the control unit 120 causes the adjustment table selection unit 1084 to select an adjustment table based on the obtained GUI parameters, and the process proceeds to step S23. The process here is similar to that in the step S14 of the second embodiment described above, and a corresponding adjustment table is selected from among multiple types of adjustment tables prepared in advance as shown in FIG. 11.

In the step S23, the control unit 120 uses the adjustment table, which was selected in the step S22, in the local contrast correction process in the luminance mainline system and also uses the adjustment table, which was selected in the step S22, for combination with the luminance-by-luminance gain table 1078 by the table combining unit 1085.

For example, when the luminance-by-luminance gain table 1078 (APCGain[Y]) shown in FIG. 4 and an adjustment table 1081 in FIG. 6A (Ohy [Y]) are to be combined together, a modified luminance-by-luminance gain table 1086 (APCGainMod [Y]) is represented by an equation (5) below.

$$APCGainMod[Y]=APCGain[Ohy[Y]] \quad (5)$$

FIG. 14 is a graph showing the modified luminance-by-luminance gain table 1086 (APCGainMod [Y]), and in FIG. 14, a broken line shows pre-modification, and a solid line indicates post-modification.

After the luminance-by-luminance gain table is modified, the same process as in the first embodiment described above is carried out, that is, D range adjustment, local contrast correction, gamma conversion, and addition of a generated edge signal are performed in this order.

As described above, according to the present embodiment, since a luminance-by-luminance gain table and an adjustment table are combined together to generate a new modified luminance-by-luminance gain table, circuits on paths in the edge signal generation system are simplified to improve processing speed. The other constitution and operational advantages are the same as those of the first embodiment described above.

Figure 15:
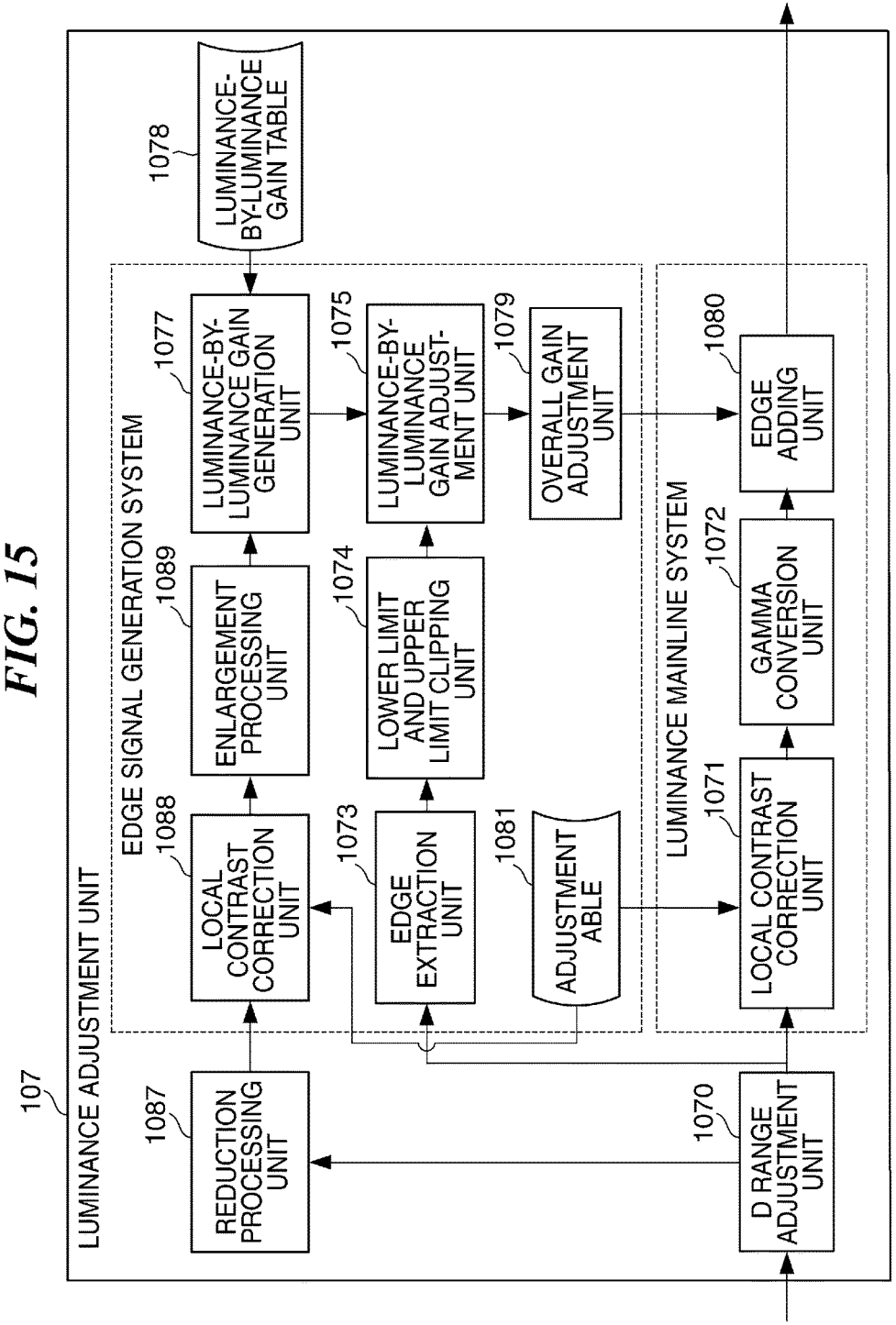
FIG. 15 is a control block diagram of a luminance adjustment unit in a digital camera which is a fourth embodiment of the image processing apparatus according to the present invention.

Referring next to FIG. 15, a description will be given of a digital camera which is a fourth embodiment of the image processing apparatus according to the present invention. It should be noted that portions overlapping or equivalent to those in the first embodiment described above will be described using the same reference numerals in the figures, and description thereof will be simplified or omitted.

FIG. 15 is a control block diagram of the luminance adjustment unit 107. Referring to FIG. 15, the luminance adjustment unit 107 is constructed by adding a reduction processing unit 1087 and adding a local contrast correction unit 1088 and an enlargement processing unit 1089 to the edge signal generation system as compared with the first embodiment (FIG. 2) described above. The low-pass filter processing unit 1076 is omitted from the edge signal generation system.

In the first embodiment described above, an output from the local contrast correction unit 1071 in the luminance mainline system is also used as an input signal for a process in the edge signal generation system. On the other hand, in the present embodiment, it is assumed, for example, that the local contrast correction process is carried out at a resolution different from that in the luminance mainline system.

The luminance-by-luminance gain adjustment aims at adjusting the appropriate amount of edge to be added according to luminance of each pixel with consideration given to gamma characteristics. On this occasion, if a high-frequency component of a subject, a noise component at high ISO, and so on are reflected with accuracy, luminance-by-luminance gains will flap, resulting in inappropriate gain enhancement. For this reason, in the first embodiment described above, the process in which a luminance signal for reference to the luminance-by-luminance gain table is subjected to low-pass filtering to lower a frequency band is carried out. This means that there is nothing wrong with cutting a high-frequency component of an output signal in the local contrast correction process.

Thus, in the present embodiment, it is considered that the local contrast correction process is carried out at low resolution in advance. First, an output signal from the D range adjustment unit 1070 is reduced by the reduction processing unit 1087. The rate of reduction should be consistent with the degree of blurring in low-pass filtering performed by the low-pass filter processing unit 1076 in the first embodiment described above. For example, when the filter coefficient is [121], it is preferred that the rate of reduction is set at ½ with consideration given to aliasing.

Thus, using the signal reduced by the reduction processing unit 1087 as an input, the local contrast correction unit 1088 carries out the local contrast correction process. After the local contrast correction process is completed, the enlargement processing unit 1089 returns the signal to a size before reduction. Luminance-by-luminance gains are generated from the signal thus obtained, which has been subjected to the local contrast correction process and of which a high-frequency component has been cut, to make a luminance-by-luminance gain adjustment and obtain an edge-adding signal.

As described above, according to the present embodiment, since a signal after D range adjustment is reduced and subjected to the local contrast correction process at low resolution and enlarged to its original size, processing speed in the time-consuming local contrast correction process is improved. Moreover, since processing by the local contrast correction unit 1071 in the luminance mainline system is performed at an original resolution, effects on mainline image quality are kept low. The other constitution and operational advantages are the same as those of the first embodiment described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-091350, filed Apr. 25, 2014, which is hereby incorporated by reference herein in its entirety.

What is claimed is:

1. An image processing apparatus comprising:
   a first correction unit configured to multiply a signal of a target pixel in image data by a first gain based on values obtained by reflecting signals of pixels around the target pixel;
   a gamma conversion unit configured to, for a signal of the target pixel output from said first correction unit, carry out gamma conversion based on the signal of the target pixel;
   an edge extraction unit configured to extract an edge signal from the image data;
   a second correction unit configured to multiply the edge signal corresponding to the target pixel by a second gain to generate a corrected edge signal; and
   an adding unit configured to add the corrected edge signal output from said second correction unit to a signal output from said gamma conversion unit,
   wherein the second gain is based on the signal of the target pixel in image data that has been multiplied by the first gain, and the edge signal is extracted from image data that has not been multiplied by the first gain.

2. The image processing apparatus according to claim 1, wherein said first correction unit multiplies the signal of the target pixel in the image data by the first gain obtained based on values found by subjecting the image data to at least one of a filtering process and a reducing process.

3. The image processing apparatus according to claim 1, wherein said first correction unit multiplies the signal of the target pixel in the reduced image data by a gain based on values obtained by reflecting signals of pixels around the pixels.

4. The image processing apparatus according to claim 1, wherein said first correction unit multiplies the signal of the target pixel in the image data by the first gain based on a table prepared in advance.

5. The image processing apparatus according to claim 4, wherein based on an amount of correction specified by user operation, said first correction unit selects a corresponding table from a plurality of tables prepared in advance.

6. A control method for an image processing apparatus, comprising:
   a first correction step of multiplying a signal of a target pixel in image data by a first gain based on values obtained by reflecting signals of pixels around the target pixel;
   a gamma conversion step of, for a signal of the target pixel obtained in said first correction step, carrying out gamma conversion based on the signal of the target pixel;
   an edge extraction step of extracting an edge signal from the image data;
   a second correction step of multiplying the edge signal corresponding to the target pixel by a second gain to generate a corrected edge signal; and
   an adding step of adding the corrected edge signal extracted in said second correction step to a signal obtained in said gamma conversion step,
   wherein the second gain is based on the signal of the target pixel in image data that has been multiplied by the first gain, and the edge signal is extracted from image data that has not been multiplied by the first gain.

7. A non-transitory computer-readable storage medium storing a program for causing a computer to execute a control method for an image processing apparatus, the control method comprising:
   a first correction step of multiplying a signal of a target pixel in image data by a first gain based on values obtained by reflecting signals of pixels around the target pixel;
   a gamma conversion step of, for a signal of the target pixel obtained in the first correction step, carrying out gamma conversion based on the signal of the target pixel;
   an edge extraction step of extracting an edge signal from the image data;
   a second correction step of multiplying the edge signal corresponding to the target pixel by a second gain to generate a corrected edge signal; and
   an adding step of adding the corrected edge signal generated in the second correction step to a signal obtained in the gamma conversion step,
   wherein the second gain is based on the signal of target pixel in the image data that has been multiplied by the first gain, and the edge signal is extracted from image data that has not been multiplied by the first gain.

8. An image processing apparatus comprising:
   a first correction unit configured to multiply a signal of a target pixel in image data by a first gain based on values obtained by reflecting signals of pixels around the target pixel;
   an edge extraction unit configured to extract an edge signal from the image data;
   a second correction unit configured to multiply the edge signal corresponding to the target pixel by a second gain to generate a corrected edge signal; and an adding unit configured to add the corrected edge signal output from said second correction unit to a signal in the image data that has been multiplied by the first gain, wherein the second gain is based on the signal of the target pixel in image data that has been multiplied by the first gain, and the edge signal is extracted from image data that has not been multiplied by the first gain.

9. A control method for an image processing apparatus, comprising a first correction step of multiplying a signal of a target pixel in image data by a first gain based on values obtained by reflecting signals of pixels around the target pixel;

an edge extraction step of extracting an edge signal from the image data;

a second correction step of multiplying the edge signal corresponding to the target pixel by a second gain to generate a corrected edge signal; and an adding step of adding the corrected edge signal output from said second correction step to a signal in the image data that has been multiplied by the first gain, wherein the second gain is based on the signal of the target pixel in image data that has been multiplied by the first gain, and the edge signal is extracted from image data that has not been multiplied by the first gain.

10. A non-transitory computer-readable storage medium storing a program for causing a computer to execute a control method for an image processing apparatus, the control method comprising:

a first correction step of multiplying a signal of a target pixel in image data by a first gain based on values obtained by reflecting signals of pixels around the target pixel;

an edge extraction step of extracting an edge signal from the image data;

a second correction step of multiplying the edge signal corresponding to the target pixel by a second gain to generate a corrected edge signal; and an adding step of adding the corrected edge signal output from said second correction unit to a signal in the image data that has been multiplied by the first gain, wherein the second gain is based on the signal of the target pixel in image data that has been multiplied by the first gain, and the edge signal is extracted from image data that has not been multiplied by the first gain.

* * * * *